United States Patent

Ripley

[15] 3,640,845
[45] Feb. 8, 1972

[54] DYNAMIC SEAL
[72] Inventor: Charles C. Ripley, San Jose, Calif.
[73] Assignee: The United States of America as represented by the United States Atomic Energy Commission
[22] Filed: July 9, 1968
[21] Appl. No.: 743,382

[52] U.S. Cl. .................................. 176/36, 92/162, 92/180, 92/192, 92/242, 137/81.5
[51] Int. Cl. ......................................................... G21c 7/16
[58] Field of Search ................ 176/36, 86; 137/81.5; 92/162, 92/172, 180, 192, 242, 246, 251, 252; 277/173, 58

[56] References Cited

UNITED STATES PATENTS

| | | | |
|---|---|---|---|
| 2,417,349 | 3/1947 | Colbaugh | 92/242 |
| 2,579,115 | 12/1951 | Harrah | 92/260 |
| 2,719,768 | 10/1955 | Webber | 92/242 |
| 3,122,045 | 2/1964 | Zilberfarb | 92/162 |
| 3,123,532 | 3/1964 | Michel | 176/36 |
| 3,154,472 | 10/1964 | Shannon | 176/36 |
| 3,285,142 | 11/1966 | Doll et al. | 92/162 |
| 3,296,944 | 1/1967 | Taylor, Jr. | 92/252 |
| 3,372,649 | 3/1968 | Webber | 92/180 |

Primary Examiner—Carl D. Quarforth
Assistant Examiner—Harvey E. Behrend
Attorney—Roland A. Anderson

[57] ABSTRACT

A control rod drive system comprising basically a neutron absorbing control rod means defining a free floating piston, actuated by liquid sodium or other reactor coolant, a dynamic seal means and fluid valve means for moving said control rod. Said dynamic seal means constructed to prevent bypass of liquid metal, such as sodium, around the piston, and including a plurality of serially disposed skirts circumferentially arranged about the piston an sleeve and having lips directed toward the high-pressure end of the piston or sleeve, and also including circumferentially disposed toroidal grooves in the piston or sleeve between each of said skirts, whereby liquid metal from said high-pressure end is deflected by said lips of said skirts to circulate in said grooves and thus prevented from passing freely around said lips. In addition, any solid particles in the liquid metal are entrapped by the circulation in the grooves of the seal means.

3 Claims, 5 Drawing Figures

PATENTED FEB 8 1972

INVENTOR.
CHARLES C. RIPLEY
BY
Roland A. Anderson
ATTORNEY

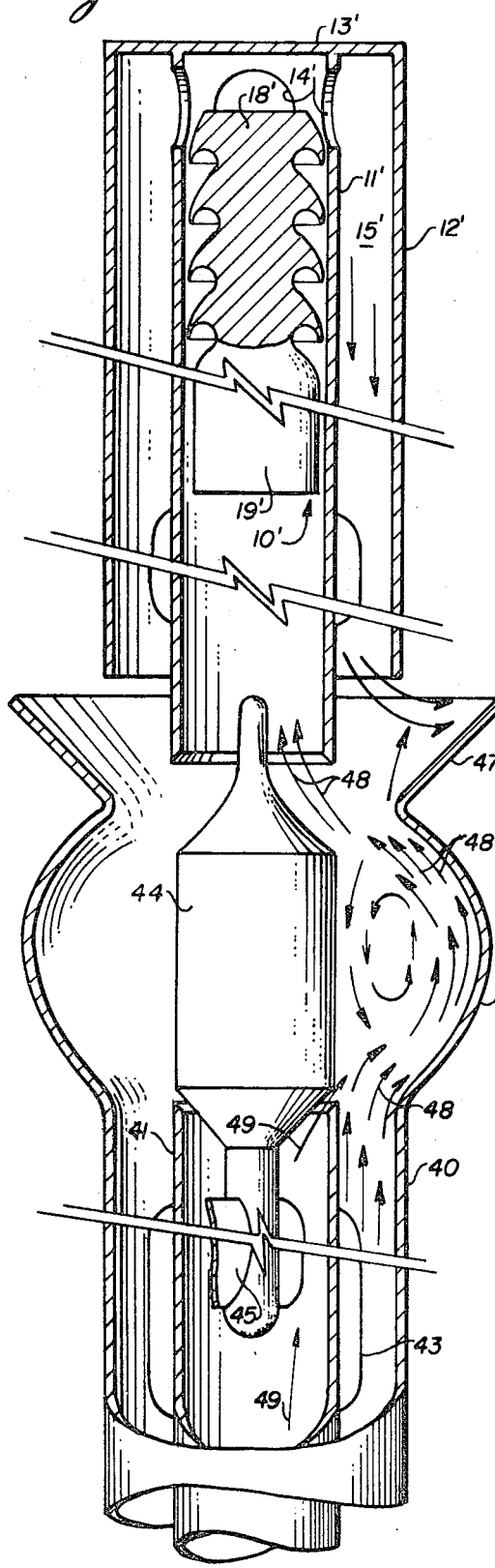
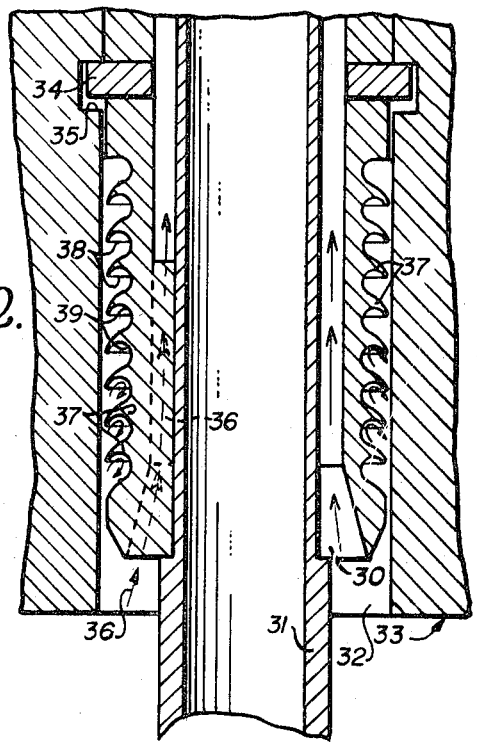
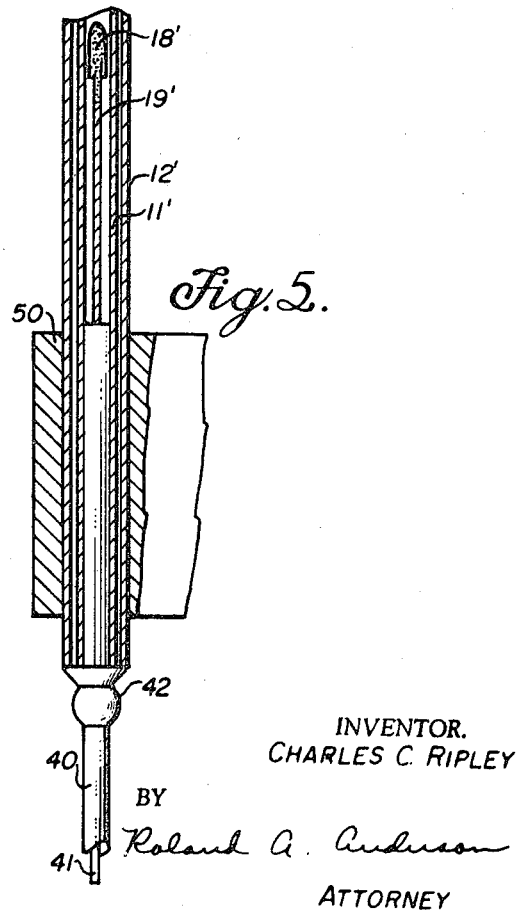
INVENTOR.
CHARLES C. RIPLEY

DYNAMIC SEAL

BACKGROUND OF THE INVENTION

The invention described herein was made in the course of, or under, AEC Contract No. AT (04-3)-189, Project Agreement No. 47, with the United States Atomic Energy Commission.

This invention relates generally to systems for moving nuclear reactor components including control rod elements, reflectors or shields; particularly to control rod driving and scramming devices utilized to position control rods of a nuclear reactor in operating or shutdown condition, and more particularly to a dynamic seal means utilized in such control rod driving and scramming devices.

In order to simplify the design and reduce the cost of a nuclear reactor, it is desirable to have as few moving mechanical parts as possible, and also to have as few penetrations of the reactor pressure vessel as possible. The latter is especially true with regards to penetrations involving relative movement of the parts, seal integrity, etc.

The nuclear reactor control rod systems of the prior art generally require one moving penetration of the reactor pressure vessel for each control rod installed in the reactor. Each of these penetrations require seals and precision machining to assure a pressuretight assembly before, during, and after operation of the reactor.

Furthermore, such equipment including valves, pumps or drive equipment, typical of all-moving part mechanical devices, is subject to wear, thereby increasing the seal problem and associated leakage of fluid therepass, such as the liquid metal coolant around pistons, sleeves, etc.

While a nuclear reactor control drive system in which a fluidic amplifier for switching a force-transmitting fluid located at the base of a piston-driven control rod assembly has been recently developed, as described and claimed in applicant's copending U.S. application Ser. No. 694,728, filed Dec. 29, 1967, now U.S. Pat. No. 3,479,250 issued Nov. 18, 1969, which overcomes the prior art problems of utilizing moving parts in reactor pressure vessels, the problem of providing effective seals existed until solved by the present invention.

SUMMARY OF THE INVENTION

The problems of providing effective seals for preventing free bypass or leakage of high-pressure fluids, such as those utilized in nuclear reactors has been substantially solved by this invention, which, in addition, serves to minimize binding of mechanical parts caused by very close fits and/or particles in the fluid. This is accomplished by providing a sealing means which is effective in relatively large radial clearances and is generally composed of a plurality of circumferentially arranged skirts and toroidal grooves, the skirts having lips directed toward the high-pressure fluid whereby the liquid metal is deflected by said lips of said skirts to circulate in said grooves, thus preventing free passage of fluid thereby.

Therefore, it is an object of this invention to provide a dynamic seal means.

A further object of the invention is to provide a seal means particularly adapted for high-pressure fluids.

A still further object of the invention is to provide a seal means which may be incorporated into either moving or fixed elements.

Another object of the invention is to provide sealing means which is particularly adapted for high-pressure liquid metal and which is constructed so as to entrap particles suspended in the liquid metal.

Another object of the invention is to provide a dynamic seal means incorporated into a free floating piston of a fuel control rod assembly for nuclear reactors.

Another object of the invention is to provide a dynamic seal means which is composed of a plurality of circumferentially disposed skirts with circumferentially disposed toroidal grooves between the skirts, whereby liquid metal, such as sodium, and any particles therein, is deflected by the lips of the skirts and circulates in the grooves, thus being prevented from passing around the seal, or jamming the moving parts.

Other objects of the invention, not specifically set forth above, will become readily apparent to those skilled in the art in view of the following description and accompanying drawings wherein:

BRIEF DESCRIPTION OF THE DRAWING

FIG. 2 is a cross-sectional view illustrating a fixed sleeve incorporating the inventive seal mean;

FIG. 4 is a view similar to FIG. 3 but showing the flow when control fluid is flowing in the system; and FIG. 5 is a partial longitudinal section through the core of a typical nuclear reactor showing the position of a poison-type control rod assembly of the type illustrated in FIGS. 3 and 4 such that the reactor is in "on" or operating condition.

DESCRIPTION OF THE INVENTION

While the following description of the FIGS. 1 and 2 embodiments of the inventive concept will be described with respect specific applications in a control rod drive system for a nuclear reactor, such description is not intended to limit the inventive seal means to the specific applications illustrated.

Figure 1:
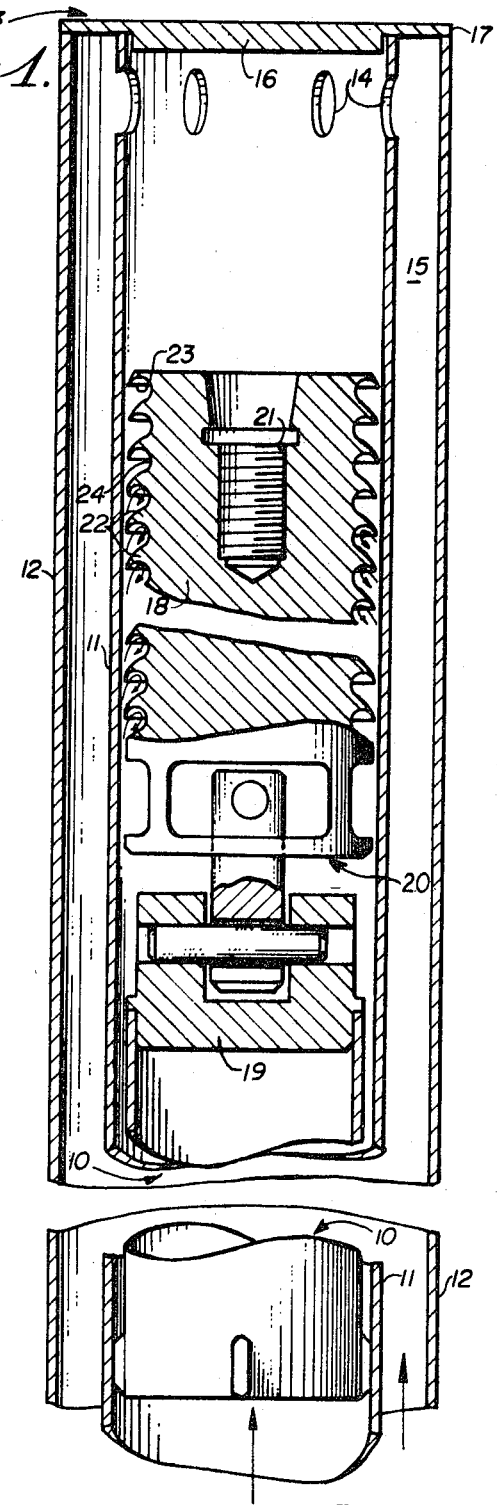
FIG. 1 is a view partially in cross section of a free floating piston arrangement utilizing the invention.

Referring now to FIG. 1, the assembly illustrated basically comprises a free floating piston assembly generally indicated at 10 positioned within an inner conduit or tube 11, with an outer conduit or tube concentrically positioned about tube 11, and an end cap assembly indicated at 13 closing the upper end of tubes 11 and 12. Piston assembly 10 is moved in an upward direction (toward end cap assembly 13) by fluid under pressure (indicated by the arrow and legend "control fluid") which is introduced into inner tube 11 beneath piston assembly 10. Any fluid above piston assembly 10 when the assembly is forced upward escapes through opening 14 in the upper end of tube 11 and flows into fluid passageway 15 defined between tubes 11 and 12. Upon release of fluid pressure (control fluid) from beneath piston assembly 10, the assembly 10 by the force of gravity plus the pressure of the fluid (indicated by arrow and legend "coolant fluid") flowing in passageway 15 and through opening 14 against the top of the piston forces piston assembly downward, the purpose of which will be described hereinbelow with respect to the description of FIGS. 3–5. End cap assembly 13, in this embodiment, includes an inwardly protruding portion 16 which is inserted into the upper end of inner tube or conduit 11, while the periphery of a flange portion 17 of the cap assembly 13 is inserted into the upper end of outer tube 12. Cap assembly 13 is secured to tubes 11 and 12 by either force fit or by other means such that a fluid seal is provided therebetween which is sufficient to withstand the pressure of the fluid utilized therein.

Piston assembly 10, in this embodiment, is composed of two sections 18 and 19 which are interconnected by a universal-type connector joint generally indicated at 20 provide a greater freedom of movement of the assembly 10. Since the universal joint 20 does not constitute part of this invention, the details thereof are deemed unnecessary and thus are not described herein. While piston section 19 may be constructed for a variety of purposes, in the present embodiment it constitutes a poison-type control rod for controlling a nuclear reactor, as will be described hereinafter. Piston section 18 is provided with a threaded counterbore 21 into which may be threaded a rod or other means for removing the piston assembly 10 from or inserting into the inner tube or conduit 11 after end cap assembly 13 has been removed. The inventive seal concept is incorporated into the periphery of the piston section 18 and is composed of a plurality of skirts 22 which extend around the circumference of the body of piston section 18, each of skirts 22 having an outwardly and downwardly extending sharp edge or lip 23 which extends in a direction toward the pressure fluid; and positioned intermediate said skirts 22 is a plurality of circumferentially disposed toroidal grooves 24, the lower concave contour of the skirts 22 defining a portion of the adjacent grooves 24, while the upper convex contour of the skirts 22 form a substantially smooth reverse-curve surface with respect to the grooves 24. Thus, fluid from the high-pressure source within tube 11 which flows past piston section 19 and along the surface of the lower portion of piston section 18, as indicated by the flow arrows, is deflected by lips 23 of skirts 22 to circulate in grooves 24 as indicated by the curved arrows therein and be thereby prevented from freely passing around said lips and thus freely leaking past said piston section 18. The number of skirts 22 and grooves 24 is determined primarily by the looseness of the piston section 18 in tube 11 (the space between skirts lips 23 and tube 11) and the size of the grooves 24, since grooves 24 can maintain only a certain amount of fluid circulating therein, and in applications where the space between lips 23 and tube 11 is relatively large, there is a tendency for more fluid to be forced therebetween, particularly after the first of the grooves 24 are filled with fluid.

In addition to the normal sealing function provided by the novel seal means, this concept additionally provides a means for effectively maintaining solid particles in suspension in the fluid, this being accomplished due to the fluid circulation or swirling action within said grooves 24, which maintains these particles in circulation therein, thus preventing or substantially reducing the passage of such particles by the skirt lips 23, which may, for example, damage the sealing capability of the seal means due to such particles being entrapped between the lips 23 and the inner surface of the tube or conduit 11, as well as reducing the probability of jamming the piston assembly by the solid particles entrained in the fluid.

Also, when the novel seal means is utilized on a movable element such as piston assembly 10, the fluid reversal in the grooves 24 provides, in addition to maintaining any solid particles in suspension in the fluid, an upward reaction force on the piston assembly 10, thus assisting upward movement of the piston assembly by the control fluid in tube 11. The solid particles so entrapped do not interfere with scramming action because the seal surface to wall relationship is conceived to be also an overrunning clutch with respect to entrapped particles. Thus, as piston moves down, particles see a greater clearance as they roll or slide into toroidal grooves. The interference becomes less as travel increases, hence a jam/and dirt resistance piston cylinder relationship; this being more so in the reactor safe direction.

While the FIG. 1 embodiment utilizes the inventive seal means (elements 22, 23 and 24) as an integral part of piston section 18, it is within the scope of this invention to construct a sleeve or the like containing elements 22–24 and which is fixedly secured around the body of the piston.

If desired, the seal assembly may be modified by the lips 23 of skirts 22 being rolled over a threaded or grooved rod or garter spring positioned in grooves 24. However, such a modification while providing additional pressure drop per groove and reinforcement for the lips 23, may substantially reduce the effectiveness of the seal means to maintain solid particles suspended in the fluid.

Referring now to FIG. 2 a fixed sleeve incorporating the inventive seal means is illustrated. The fixed sleeve indicated at 30 is secured such as by welding to a conduit or tube 31 which extends through a passageway or opening 32 in a fixed structure such as a reactor core support plate 33, sleeve 30 being retained in support plate 33 by a removable retainer member 34 which extends into a notch or groove 35 adjacent passageway 32. Sleeve 30 is constructed so as to define a plurality of fluid passages 36 about the external surface of tube 31 such that coolant fluid, as indicated by the arrows and legend can flow through passageway 32 and passages 36 to a point of use, such as to passageway 15 of the FIG. 1 embodiment for movement of the piston assembly 10 thereof as described below with respect to FIGS. 3–5. The outer surface of sleeve 30 is constructed to define a plurality of serially disposed skirts 37 circumferentially about the sleeve and having sharp-edged lips 38 directed toward the high-pressure fluid entering passageway 32, and also including a circumferentially disposed toroidal groove 39 in said sleeve intermediate each pair of said skirts 37, whereby, as described above with respect to FIG. 1, fluid flowing between sleeve 30 and the surface defining passageway 32 is deflected by lips 38 of skirts 37 to circulate in grooves 39, and thus prevented from freely flowing past the external surface of the sleeve 30 while maintaining any solid particles suspended in the fluid by the swirling motion of the fluid in grooves 39 as indicated by the curved arrows therein. The reaction force created by the inventive seal construction (elements 37–39) is shown by the retainer member 34 being held against the upper surface of the notch or groove 35 in core support plate 33.

Again, the seal means described in FIG. 2 as elements 37, 38 and 39 may be constructed on a separate sleevelike assembly which is inserted over and secured to sleeve 30, or may be integral with the main body as illustrated.

Figure 3:
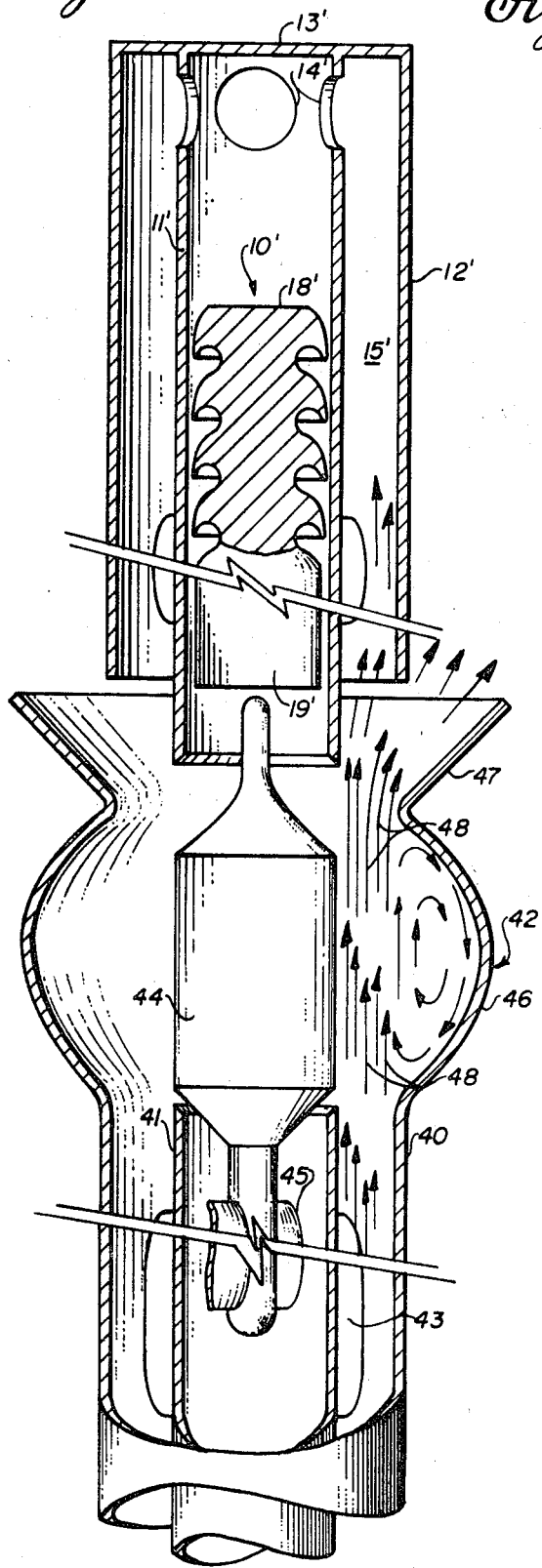
FIG. 3 is a longitudinal section through a control rod assembly utilizing the inventive seal of the type illustrated in FIG. 1 and showing the flow of force-transmitting fluid when no control fluid is flowing.

With reference to FIGS. 3 and 4, the system illustrated, which utilizes the invention embodied in FIG. 1 in a control system basically comprises a force-transmitting fluid conduit or tube 40 concentric about a control fluid conduit or tube 41 with a fluidic flow switch unit generally indicated at 42, i.e., a fluidic or hydraulic amplifier deflector, extending upwardly from the ends of conduits 40 and 41 toward concentric inner and outer cylindrical conduits or tubes 11' and 12', coaxially arranged with respect to conduits 40 and 41. The output of switch unit 42 is directed into either the bottom end of outer tube 12', to be communicated to the upper end of inner tube 11' via passageway 15' and openings 14' to drive piston assembly 10' downward; or into the bottom end of tube 11' to drive piston assembly 10' upward, depending on whether control fluid is flowing or not. Piston assembly 10', as in the FIG. 1 embodiment, is composed of sections 18' and 19' with piston assembly section 18' located on the upper end and section 19' which is located on the lower end constituting a neutron-absorbing control rod. Also, as described in FIG. 1, piston assembly 10' is provided with the inventive seal means. If desired the piston assembly sections 18' and 19' may be interconnected of a universal-type joint as in the FIG. 1 embodiment. Also, the piston section 18' may be positioned below the control rod section 19'.

When no control fluid is flowing in control conduit or tube 41, see FIG. 3, a portion of the force-transmitting fluid flowing upward through conduit 40 is directed by hydraulic or fluidic switch unit 42 to enter the bottom of passageway 15' between tubes 11' and 12', these tubes being closed at the upper end by an end cap or plate 13'.

When control fluid is caused to flow in control conduit 41, see FIG. 4, the flow of force-transmitting fluid is diverted, i.e., switched, to enter into the bottom end of inner tube 11' with such force as to drive piston assembly 10' (piston section 18' and control rod section 19') upward in tube 11', the fluid being assisted by the reaction caused by the novel seal means as described above. To maintain piston assembly 10' in the "up" position, the flow of control fluid must be continuous.

The force-transmitting fluid and the control fluid can be supplied under pressure by the use of an electromagnetic pump or other pressure generating devices known in the art.

As shown in FIGS. 3 and 4, conduits or tubes 40 and 41 are maintained in spaced relationship by spacer fins 43. The hydraulic amplifier or fluidic switch unit 42 comprises a generally cylindrical spindle formed central guide body 44, coaxial with the common longitudinal axis of conduits 40 and 41, and maintained in fixed spaced relation to the end of conduit 41 by spacer support fins 45; and an outwardly projecting annulus 46 which defines a barrel or spherical segment spaced in a general circumferential relation with respect to guide body 44, annulus 46 being provided with an outwardly extending lip 47 for directing the flow of surplus fluid out into the coolant system of the reactor, in this embodiment.

While the details of the fluidic switch unit 42 do not constitute part of this invention, the general operation thereof is set forth to provide a better understanding of the FIGS. 3 and 4 device which utilizes the invention.

Central guide 44 performs several functions. It acts, when no control fluid is flowing (see FIG. 3) to direct the force-transmitting fluid, indicated by arrows at 48, by utilizing the Coanda effect along the surface of guide 44 into the passageway 15' between tubes 11' and 12'. Secondly, it also acts, when control fluid is flowing, as indicated by arrows at 49, (see FIG. 4) to direct the control fluid into the force-transmitting fluid stream to deflect it into protruding annulus 46, as indicated by arrows 48, which in turn diverts the force-transmitting fluid into the bottom end of tube 11'. As known in the art, the Coanda effect is the tendency of a fluid stream to adhere to a chamber wall along which the fluid is flowing until it comes to a portion of the wall which is so sharply curved that the forces due to the momentum of the fluid exceed the forces holding the fluid against the wall.

In general, referring to FIG. 5, the entire assembly illustrated in FIGS. 3 and 4 may be located inside a pressure vessel (not shown) containing a nuclear reactor core 50. In actual practice, a plurality of such assemblies would be used in ordered array throughout core 50, the exact number depending upon the neutron control requirements of the core as determined by conventional practice. As pointed out above the respect to FIG. 3, the lower section 19' of piston assembly 10' may contain a neutron absorber or poison and is held outside reactor core 50 at the upper end of tube 11' when the force-transmitting fluid is directed into the bottom of tube 11' as illustrated in FIG. 4, the fluid being assisted by the reaction force created by the seal means or piston section 18' as described above with respect to FIG. 1. Any failure of flow in either the force-transmitting fluid or control fluid will cause the control rod 19' to fall under the force of gravity down into core 50 and shut down the reactor. With the control shut off, the force-transmitting fluid acts against the top of piston section 18' via passageway 15' and openings 14' thereby maintaining the reactor shut down. It will be apparent that such an installation is appropriate to provide a failsafe scram safeguard in the event of a reactivity excursion, or otherwise to shut down the reactor with great speed and certainty.

It has thus been shown that the present invention provides a novel seal means which can be effectively utilized on either fixed or movable assemblies. In addition to its sealing function, the invention serves to maintain any solid particles suspended in the fluid while providing a reaction force which tends to move the member upon which the seal means is located in the direction of the fluid being supplied thereto.

While particular embodiments of the invention have been illustrated and described, modification will become apparent to those skilled in the art, and it is intended to cover in the appended claims all such modifications as come within the spirit and scope of the invention.

I claim:

1. A seal means for substantially preventing the flow of fluid between a pair of elements while functioning to maintain solid particles in suspension in the fluid and providing a reaction force on one of the pair of elements comprising: a longitudinally extending hollow member, a body member positioned within said hollow member, a plurality of skirtlike members positioned in spaced relationship about the circumference of said body member, each of said skirtlike members including an outer sharp-edged liplike portion, said liplike portion extending in a direction toward an associated fluid flow, said skirtlike members each being constructed to define a convex surface and a concave surface, said convex and concave surfaces joining to define said sharp-edged liplike portion of each skirtlike member, and a plurality of toroidal grooves defined by and positioned about the circumference of said body member, one of said grooves being positioned intermediate an adjacent pair of said skirtlike members, each of said toroidal grooves having a portion thereof forming at least a portion of said concave surfaces of said skirtlike members, said convex surfaces of said skirtlike members adjoining another portion of said toroidal grooves so as to define a smooth reverse-curve therebetween, whereby an associated fluid flowing past said skirtlike members is deflected by said liplike portion of said skirtlike members to circulate in said toroidal grooves thereby substantially preventing flow of fluid between said hollow member and said body member while maintaining particles in an associated fluid in said toroidal grooves and providing a reaction force on said body member in a direction of flow of an associated fluid due to fluid flow reversal caused by said liplike portions and said toroidal grooves, said body member comprising at least a portion of a free floating piston assembly adapted to be moved in one direction by associated pressurized fluid directed toward said liplike portions of said skirtlike members, and moved in the opposite direction by at least the force of gravity when such associated pressurized fluid is removed, said hollow member comprising a first conduit means, a second conduit means concentrically spaced about said first and second conduit means to define a passageway therebetween said first and second conduit means being closed at one end thereof, said first conduit means being provided with at least one aperture therein to provide fluid communication adjacent said closed end between said first conduit interior and said passageway, and means for selectively directing an associated pressurized fluid into the opposite end of said first conduit means or into said passageway for moving said piston assembly in opposite directions.

2. The combination defined in claim 1, wherein said means for selectively directing an associated pressurized fluid comprises a fluidic switch unit, said switch unit being provided with conduit means for force-transmitting and control fluid, and means for directing control fluid into associated force-transmitting fluid for selectively directing associated force-transmitting fluid into said first conduit means or into said passageway.

3. The combination defined in claim 2, wherein said piston assembly include a neutron-absorbing section adapted to be moved by said switch unit into and out of a nuclear reactor core for controlling said reactor.

* * * * *